United States Patent

[11] 3,600,637

[72] Inventor Helge Bertil Bergkvist
 Nordanla, Beottby, Sweden
[21] Appl. No. 758,777
[22] Filed Sept. 10, 1968
[45] Patented Aug. 17, 1971
[32] Priority Oct. 28, 1964, Sept. 13, 1967
[33] Sweden
[31] 12958/64 and 12625/67
 Continuation-in-part of application Ser. No. 500,578, Oct. 22, 1965, now abandoned.

[54] ELECTRIC LOCK
 13 Claims, 3 Drawing Figs.
[52] U.S. Cl. .................................................. 317/134, 340/164
[51] Int. Cl. ..................................................... E05b 49/00
[50] Field of Search ............................................ 317/134; 340/164

[56] References Cited
 UNITED STATES PATENTS
 3,242,388 3/1966 Tellerman ..................... 317/134

2,543,608 2/1951 Stamper ........................ 340/164
2,968,790 1/1961 Carbonara ..................... 340/164

Primary Examiner—Lee T. Hix
Attorney—McGlew and Toren

ABSTRACT: An electric lock operating an actuator in response to a sequence of electric signals supplied at predetermined points in an operating cycle. A switching device serves to direct signals supplied at the predetermined points in the operating cycle to a first relay device and to direct signals supplied at any other point to a second relay device. If the first relay device receives signals in accordance with the predetermined sequence, it operates in steps—each corresponding to one signal—to close or otherwise operate a control circuit of the actuator. If the second relay device receives a signal at any point in the operating cycle, it prevents the first relay device from closing or operating the control circuit for the remainder of the operating cycle. A presettable signal transmitter is provided which, after preselected pushbuttons have been depressed, can be set in operation to automatically supply signals at points in the operating cycle corresponding to the preselected pushbuttons.

ELECTRIC LOCK

This application is a continuation-in-part of my copending application Ser. No. 500,578 filed Oct. 22, 1965, now abandoned.

This invention relates to code operated devices, hereinafter referred to as electric locks, responsive only to a predetermined sequence of electric code signals to control a utilization circuit.

The primary object of the invention is to provide an electric lock which is responsive to a predetermined sequence of signals to control a utilization circuit and responsive to a false signal to prevent the control of the utilization circuit until the device has been restored to an initial state and the proper sequence of signals has then been given.

A more specific object is to provide an electric lock including latching relay means operable by a predetermined sequence of signals to establish step by step a control circuit, the latching relay means being so arranged that each signal following the first one has to pass through contacts closed by the next preceding signal in order that a step in establishing the control circuit may be performed.

Another object is to provide presettable signal generating means capable of producing signals at preselected points in an operating cycle.

BRIEF DESCRIPTION OF THE DRAWINGS

The above and other objects, features and advantages of the present invention will be better understood from the following description of the invention considered in connection with the accompanying drawings, in which.

DESCRIPTION OF THE PREFERRED EMBODIMENTS

Figure 2:
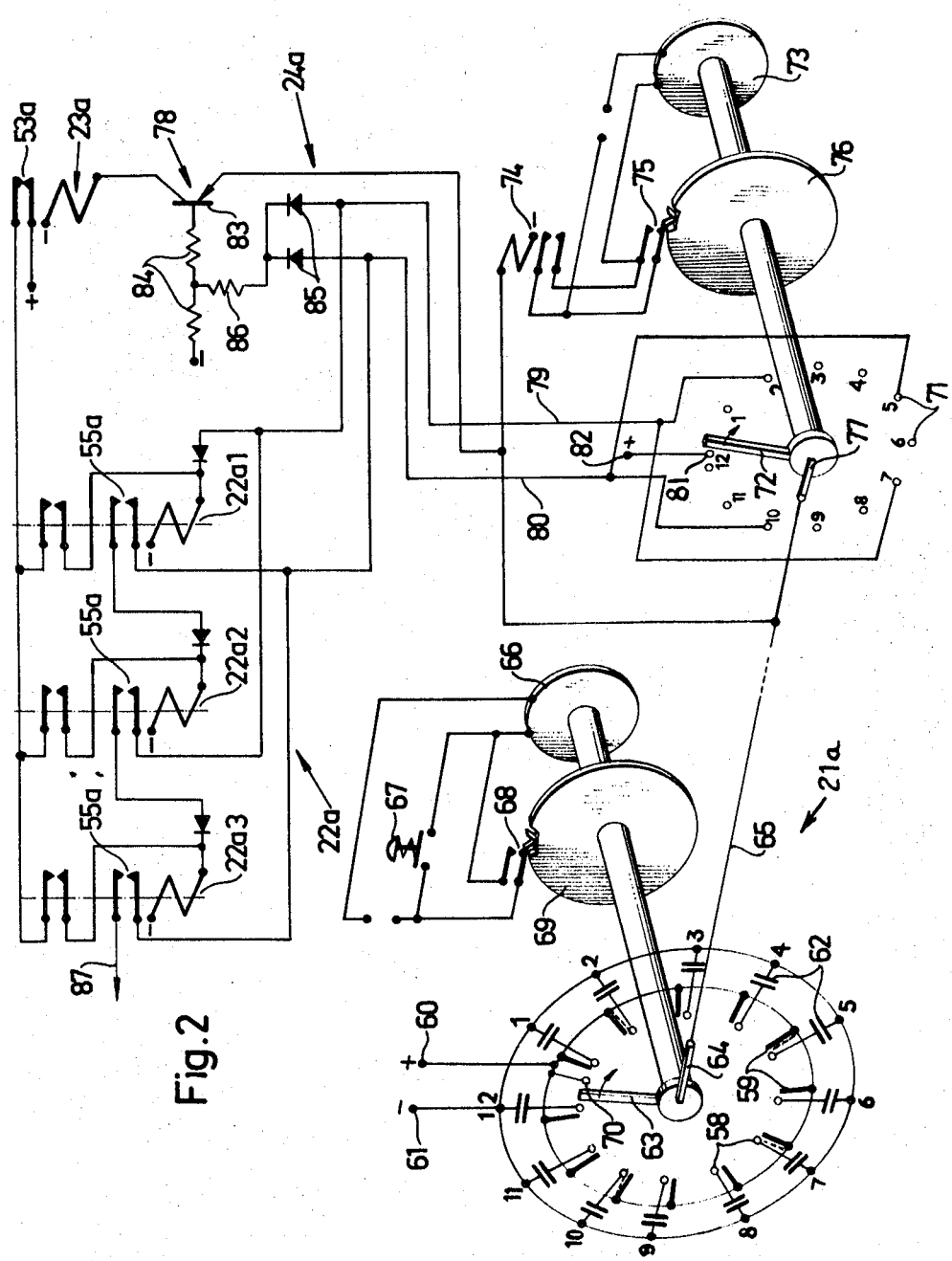
FIG. 2 is a diagrammatic view of a second embodiment in which the signals are supplied and timed by means of a presettable signal transmitter.
Figure 3:
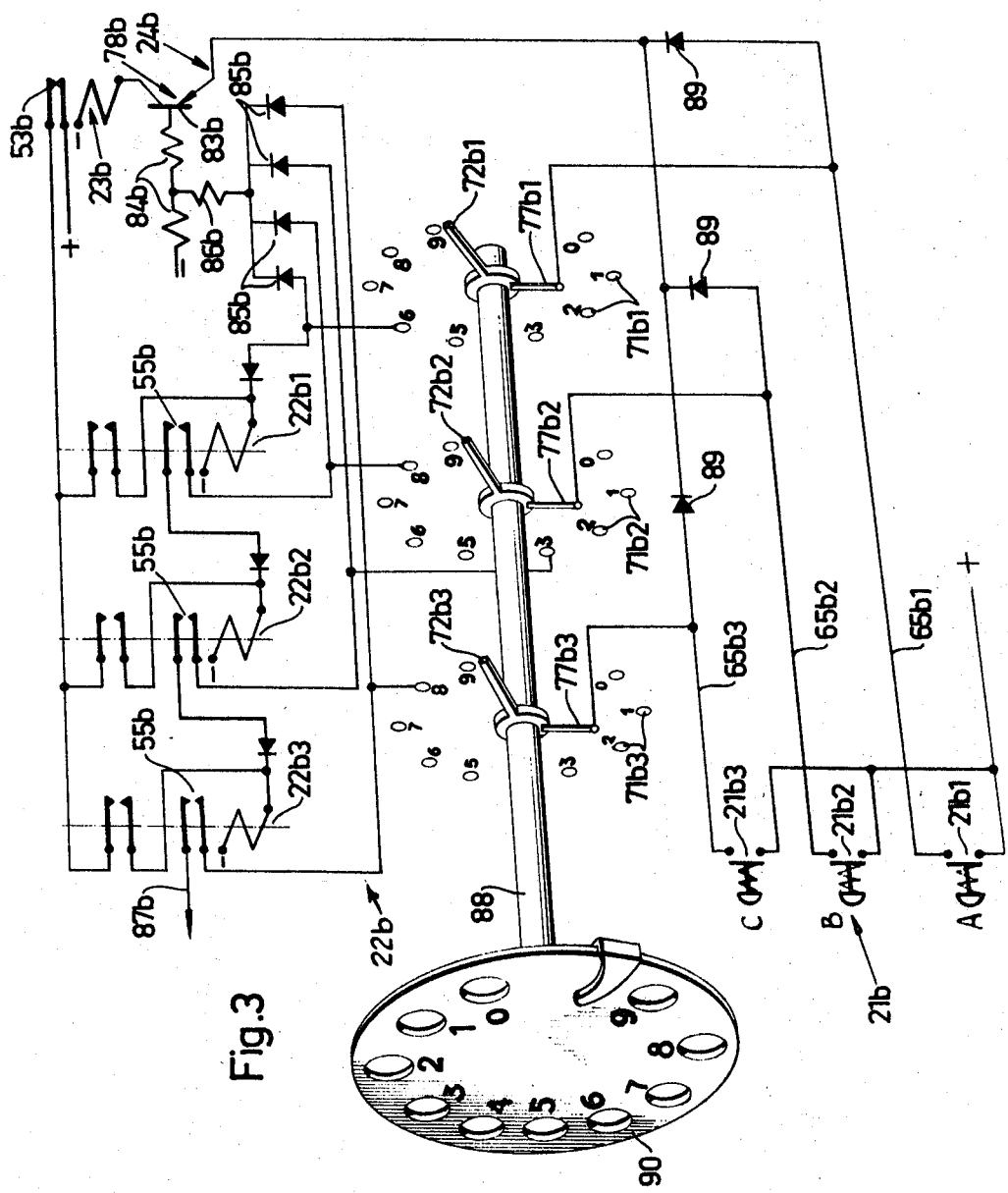
FIG. 3 is a diagrammatic view of a third embodiment in which the signals are supplied by means of selectively actuatable pushbutton switches and a telephone-type dial is used for the selection of the points in the operating cycle at which the signals are supplied.

In the description which follows those main elements of the three different embodiments which are equivalents of each other are designated by the same reference numbers. However, such elements of the embodiments shown in FIGS. 2 and 3 are distinguished from their equivalents of the embodiment shown in FIG. 1 by the suffixes "*a*" and "*b*," respectively, used in conjunction with their common reference numeral.

Briefly, the device according to the invention comprises four main elements. These elements are: Signal supplying means, hereinafter referred to as a signal transmitter 21, by means of which signals may be supplied at selected points in the operating cycle, the selection of the points being made with the aid of a suitable indicator; first relay means, hereinafter referred to as a code relay device 22, which is responsive to the predetermined sequence of signals to establish step-by-step a control circuit of a lock actuator or another load device or utilization circuit; second relay means, hereinafter referred to as a defeater relay 23, which is responsive to a false signal to prevent control of the lock actuator; and switching means, hereinafter referred to as a switching device 24, serving to direct the supplied signals either to the code relay device 22 or to the defeater relay 23, depending on whether the signals are supplied in accordance with the predetermined sequence or not.

Figure 1:
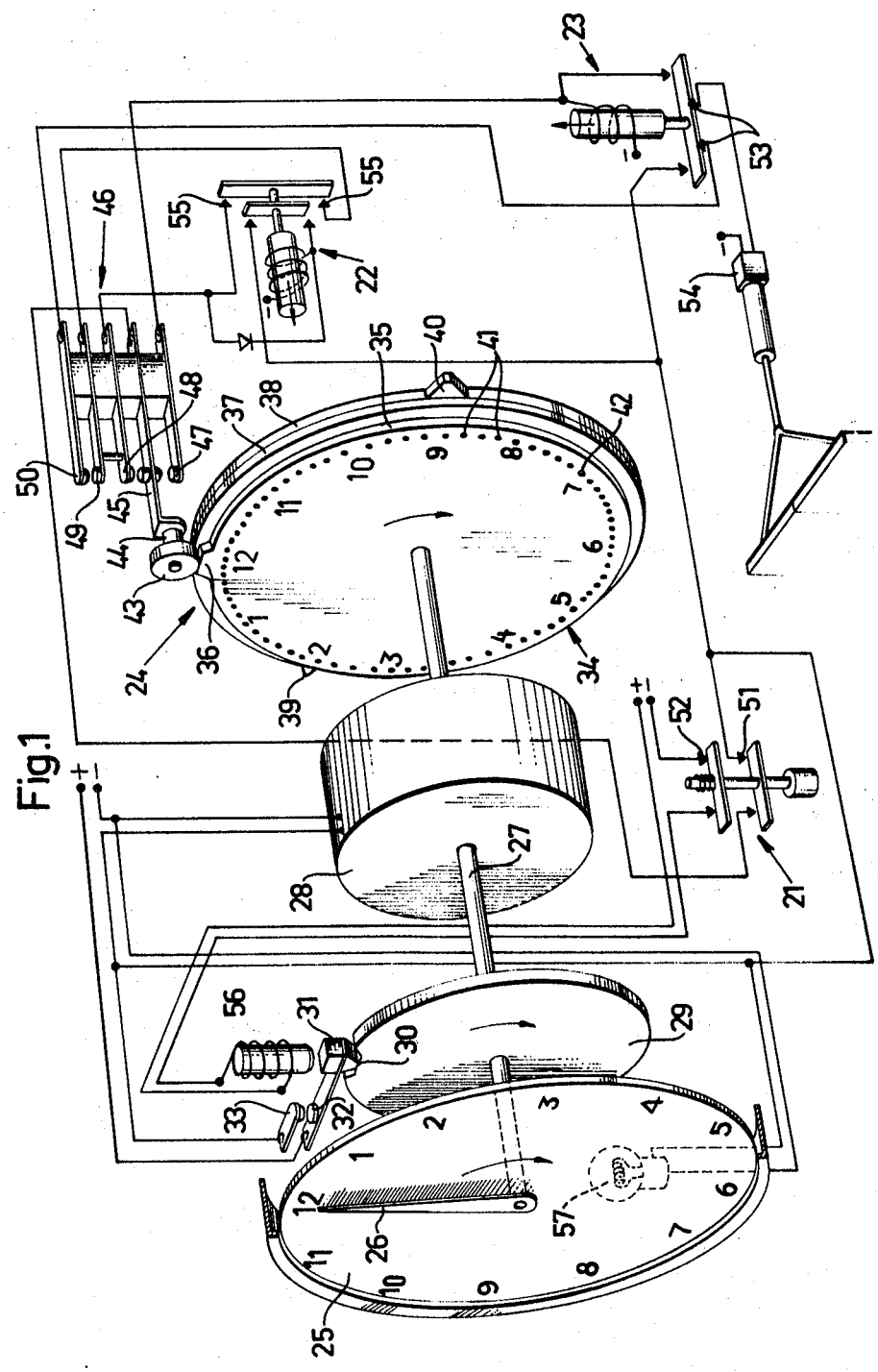
FIG. 1 is a diagrammatic view of a first embodiment in which the signals are supplied by means of a pushbutton switch and timed by means of a pointer cooperating with a dial.

Referring now to FIG. 1 of the drawings, the embodiment shown therein is assumed to be used for controlling a door opener. In this embodiment the signal transmitter 21 is in the form of a spring-loaded double-pole pushbutton switch which is positioned outside the door to be opened and which is also used to initiate the operating cycle of the device. The signals are timed by an indicator which is visible from the signal transmitter 21. The indicator is in the form of a dial 25 resembling a clock dial and having a rotatable pointer 26 mounted at its center. The remaining parts of the device are not visible from outside the door.

The pointer 26 is secured to one end of a shaft 27 driven by an electric motor 28. To the shaft 27 is also secured a cam 29 which keeps the supply circuit of the motor 28 closed in all positions except the initial position of the device which is the position shown. To this end the cam 29 consists of a circular disk having a peripheral notch 30 for a spring-loaded cam follower 31. The cam follower 31 normally engages the periphery of the cam disk 29 and is provided with a contact 32 that closes against a fixed contact 33. When the cam follower 31 engages the notch 30, the supply circuit of the motor 28 is broken, but as soon as the motor is started and has rotated the cam 29 through a small angle, the cam follower 31 is forced out of the notch 30 and keeps the supply circuit closed until the cam 29 has been rotated through 360° and the cam follower 31 again enters the notch 30 at the termination of the operating cycle.

To the shaft 27 there is also secured a cam assembly 34. This cam assembly 34 comprises a circular cam member 35 provided with a cam lug 36 and two circular cam members 37 and 38 provided with cam lugs 39 and 40, respectively. The three cam members 35, 37 and 38 are coaxial and angularly adjustable in relation to each other. They each have a ring of relatively closely spaced holes 41. The rings of holes on all cam members have the same diameters and the holes are uniformly spaced on all members. Thus, the cam members can be adjusted in small steps to different relative angular positions and secured to each other by a pin 42. To facilitate adjustment the cam member 35 is graduated in correspondence with the graduation of the dial 25.

The cam member 35 actuates a cam follower in the form of a roller 43. The two other cam members 37 and 38 actuate a common cam follower in the form of a roller 44 mounted on the same axle pin as the roller 43. The common axle pin of the cam followers is secured to a contact spring 45 of a switch assembly 46 that is provided with two other contact springs 47 and 48 located one on each side of the contact spring 45. There are also two additional contact springs 49 and 50 located on one side of the contact spring 48. The switch assembly 46 is arranged so that, when the cam lug 39 actuates the cam follower roller 44, the contact spring 45 engages the contact spring 48, and when the cam lug 40 actuates the cam follower roller 44, electrical connection is established both between the contact springs 45 and 48 and between the contact springs 49 and 50. To this end the contact spring 49 is actuated via the contact spring 48. When none of the cam lugs 39 and 40 actuates the cam follower roller 44, an electrical connection is maintained between the contact springs 45 and 47 owing to spring-loading of the contact spring 45, and when the cam lug 36 actuates the cam follower roller 43, the contact spring 45 is held in a neutral position intermediate the adjacent contact springs 47 and 48 as shown.

The contact spring 45 is connected to one contact of one of two pairs of switch contacts 51 and 52 of the signal transmitter 21. The contact spring 47 is connected to the operating circuit of the defeater relay 23 which is a latching relay and operates a pair of break contacts 53 connected in series with a control circuit that controls the energization of a motor of a door opener mechanism 54. If the defeater relay 23 is operated, the break contacts 53 are opened and held open by the latching circuit which is parallel to the supply circuit of the motor 28. The contact spring 48 is connected to one contact of a pair of make contacts 55 of a slow-operating latching relay which constitutes the above-mentioned code relay device 22. The contact spring 49 is connected to the other contact of the pair of make contacts 55. The contact spring 50 is connected to one contact of the pair of break contacts 53 of the defeater relay 23.

The operation of the above-described device will now be explained, assuming that the initial position is the position shown and that the elements of the secret code are "2" and "9." Thus, when the pointer 26 indicates "2" on the dial 25 the first signal should be supplied, and when the pointer indicates "9" on the dial the second signal should be supplied.

The pushbutton of the signal transmitter 21 is first depressed to initiate the operating cycle of the device and is then immediately released. The depressing of the pushbutton closes both pairs of switch contacts 51 and 52. The switch contacts 52 close the energization circuit of a solenoid 56 which then withdraws the cam follower 31 from the notch 30 of the cam 29 so as to close the supply circuit of the motor 28. When the motor 28 has rotated the cam 29 through a small angle, the cam follower 31 keeps the supply circuit closed. When the supply circuit of the motor 28 is closed, a lamp 57 is simultaneously lighted to illuminate the dial 25.

The closing of the switch contacts 51 when the device is in its initial position has no effect, since the contact spring 45 is then held in the neutral position between the contact springs 47 and 48 by the cam lug 36 of the cam member 35. As soon as the cam assembly 34 and thus the cam member 35, has been rotated through a small angle, the cam follower roller 43 is disengaged from the cam lug 36 and the contact spring 45 then engages the contact spring 47. Since the pushbutton is released immediately after its depression, the circuit in which the contact springs 47 and 48 are connected is still broken. As a result, the engagement of the contact springs 47 and 48 with each other has no effect, provided that the pushbutton is not depressed again when it should not be depressed.

When the pointer 26 indicates "2" on the dial 25, the cam lug 39 of the cam member 37 actuates the cam follower roller 44 to establish short-duration contact between the contact springs 45 and 48 and simultaneously it disengages the contact springs 45 and 47 from each other for a brief interval. Now, if the pushbutton of the signal transmitter 21 is depressed again and immediately released, a signal is supplied to the operating circuit of the latching code relay 22 which then closes its make contacts 55 and keeps them closed by means of its latching circuit after the pushbutton is released. When the cam follower roller 44 is disengaged by the cam lug 39, the contact spring 45 again engages the contact spring 47.

When the pointer 26 indicates "9" on the dial, the cam lug 40 of the cam member 38 engages the cam follower roller 44 to establish short-duration electrical connection both between the contact springs 45 and 48 and between the contact springs 49 and 50. A new signal then supplied by the signal transmitter 21 will pass directly to the door opener 54 to start the motor therein (not shown). The motor 28 rotates the cam 29 until the pointer 26 indicates "12" sn the dial 25, i.e. until the initial position is reached and the operating cycle is terminated. The cam follower 31 then enters the notch 30, breaking the supply circuit of the motor 28 and stopping it.

If the pushbutton of the signal transmitter 21 is depressed when the pointer 26 does not indicate "2" or "9," or if the pushbutton is not released immediately after its depression, the defeater relay 23 will receive a signal to open its break contacts 53 and keep them open until the cam 29 has returned to the initial position and the latching circuit of the defeater relay (and that of the code relay 22) is broken. Thus, the control circuit of the door opener 54 cannot be closed until a new operating cycle has been initiated and the proper, and only the proper, signals have been supplied.

One advantage gained by the device of the invention is that the secret code can be changed very easily. If the shaft 27 is rotated relatively slowly, the number of code elements can be correspondingly high. The number of possible codes may be increased without limit by providing the cam assembly 34 with a number of additional cam members similar to the cam members 37 and 38. In such case a corresponding number of code relays similar to the code relay 22 are interconnected to form a series of code relays (in the embodiment of FIG. 1 the series of code relays may be regarded as comprising only the single code relay shown). The switch assembly 46 must also be provided with a corresponding number of additional contact springs. If there are more than two or three code relays in the series, it is preferable to replace the switch assembly 46 with an assembly that provides the switching action of the contact springs 45 and 24 and also has two pairs of contact springs which are closed alternately by the cam lugs of the several cam members. The relay series can then be arranged so that a signal passing through the code relay contacts closed by one relay is supplied to the operating circuit of the next relay in the series and so on.

Although the relays shown in the drawing are electromagnetic relays, relay action can be provided in other ways, by electronic gates and multivibrators, for example. Relays of this type have the advantage of being noiseless, making it impossible to detect the code by ear. Thus the term "relay" as used herein is not to be taken as limited to electromechanical or other relays having movable contacts but should be interpreted in a broad sense to include other electrically operated devices providing the relay action described herein.

Moreover, the signal transmitter need not be a switch as shown; the signals could be supplied by a signal transmitter responding to optical, acoustic or radio signals.

If the cam assembly 34 is rotated at a known, constant speed, by means of a synchronous motor for example, the second hand of a watch could be used for timing the signals. This may be advantageous if it is desired to originate the signals in remote locations by means of a radio transmitter or the like.

Referring to FIG. 2 in the drawings, the embodiment shown therein comprises a presettable signal transmitter 21a which, after it has been preset and the operating cycle has been initiated, automatically supplies a sequence of preselected signals to the switching device 24a which then forwards the signals to the code relay device 22a or to the defeater relay 23a, depending on whether the signals are in accordance with the predetermined sequence or secret code or not. For purposes of clearness, and since the practical realization thereof is a matter of mechanical skill, this signal transmitter is illustrated but diagrammatically.

The signal transmitter 21a has 12 stationary contacts 58 numbered from "1" to "12," which are arranged with uniform spacing in a circular row. To each contact 58 belongs a normally open spring-loaded switch 59 which is manually actuatable to connect the contact to the positive pole of a DC voltage source represented by a positive terminal 60 and a negative terminal 61 in the drawing. Between each contact 58 and the negative pole of the voltage source a capacitor 62 is connected. A rotary contact arm 63 is rotatably mounted in the center of the circular row of contacts 58 and adapted to engage the contacts sequentially when rotated. A brush contact 64, to which a signal transmission lead 65 is connected, engages the hub of the contact arm 63 which is rotated clockwise at a predetermined angular speed by an electric motor 66. The supply circuit of the motor 66 can be closed by means of a spring-loaded pushbutton switch 67, and as soon as the motor has rotated the contact arm through a small angle, contacts 68 operated by a cam 69 secured to the shaft of the motor are closed to maintain the supply circuit closed until the contact arm 63 has completed one revolution.

The signal transmitter 21a also has a stationary contact 70 which is directly connected to the positive pole 60 of the voltage source and positioned in the circular row of contacts 58 between the contacts numbered "12" and "1."

Turning now to the switching device 24a, which, for the same reason as explained above, is also but diagrammatically illustrated, this partly resembles the signal transmitter 21a in that it has a circular row of 12 stationary, uniformly spaced contacts 71, numbered from "1" to "12," and a rotatable contact arm 72 adapted to engage the contacts 71 sequentially when rotated. The contact arm 72 is rotated clockwise in synchronism with the contact arm 63 of the signal transmitter 21a by an electric motor 73. The supply circuit of the motor 73 is initially closed by a starting relay 74 and then maintained in closed condition until the contact arm 72 has completed a full revolution by contacts 75 operated by a cam 76 secured to the shaft of the motor. A brush contact 77 engaging the hub of the contact arm 72 is connected to the signal transmission lead 65, the operating circuit of the starting relay 74 and to a normally conducting controlled-conduction device 78 which forms part of the switching device 24a and is described in more detail hereinafter.

Of the 12 contacts 71 those numbered "2" and "7" are connected to a lead 79, while those numbered "5" and "10" are connected to a lead 80. The remaining eight contacts are isolated and may be removed, if desired. However, as will be seen from the following description of the operation, the secret code is determined by those contacts 71 which are connected to the leads 79 and 80 (thus, in this case the code is "2," "5," "7," "10"), and in order that the code may easily be changed, it is preferred to have all 12 contacts.

The switching device 24a also has a stationary contact 81 which is connected to the positive pole 82 of a DC voltage source and positioned in the circular row of contacts 71 between the contacts numbered "12" and "1."

The controlled-conduction device 78 comprises a transistor 83, the emitter-collector circuit of which is connected between the brush contact 77 and the operating circuit of the defeater relay 23a. The transistor 83 is normally biased to a conducting condition by two voltage-divider resistors 84. The two leads 79 and 80 are connected to the connecting point between the resistors 84 through diodes 85 and a common resistor 86.

The code relay device 22a comprises a series of three latching code relays 22a1, 22a2 and 22a3, each having make contacts 55a and latching contacts. The operating circuit of the first code relay 22a1 is directly connected to the lead 79 of the switching device, while the operating circuit of the second code relay 22a2 is connected to the lead 80 through the make contacts 55a of the code relay 22a1 and the operating circuit of the third code relay 22a3 is connected to the lead 79 through the make contacts 55a of the second code relay 22a2. Thus, in order that the second and third code relays may be operated, The first, respectively the first and second, code relays must be previously operated. The make contacts 55a of the third code relay 22a3 serve to connect a control or operating circuit represented by an arrowed lead 87 to the lead 80. The latching contacts of the three code relays are connected to a latching voltage supply through break contacts 53a of the defeater relay 23a.

The operation of the device shown in FIG. 2 will now be explained, assuming first that the proper sequence of signals are supplied. In the initial position of the device, which is the position shown, the contact arm 63 of the signal transmitter 21a is rotated to a position between the contact 58 numbered "12" and the contact 70, and the contact arm 72 of the switching device 24a is rotated to a position between the contact 81 and the contact 71 numbered "1". As mentioned above the secret code is "2," "5," "7," "10."

First the operator momentarily depresses the pushbutton switches 59 associated with the contacts 58 numbered "2," "5," "7," and "10" as indicated in broken lines to charge the corresponding capacitors 62. Then he initiates the operating cycle by momentarily depressing the pushbutton switch 67, whereby the motor 66 is set in operation. After the operator has released the switch 67 the cam controlled contacts 68 maintain the supply circuit of the motor closed until the contact arm 63 has performed a single full revolution.

When the contact arm 63 has been rotated through a small angle, it engages the contact 70 to connect the positive terminal 60 to the signal transmission lead 65. As a result the starting relay 74 of the switching device 24A is operated to close the supply circuit of the motor 73. The supply circuit is then maintained in closed condition by the cam operated contacts 75 until the contact arm 72 has been rotated through a single full revolution; as already mentioned, the contact arm 72 is rotated in synchronism with the contact arm 63 of the signal transmitter. The signal operating the starting relay 74 also passes to the operating circuit of the defeater relay 23a, since the transistor 83 is conducting, but the only result is a brief opening of the break contacts 53a.

As the contact arms 63 and 72 are rotated by the motors 66 and 73 they engage the contacts 58 and 71 sequentially. When the contact arm 63 engages the contact 58 numbered "12" the first code signal is supplied in that the previously charged capacitor 62 connected to this contact is discharged through the contact 58 numbered "2," the contact arm 63, the brush contact 64, the signal transmission lead 65, the brush contact 77, the contact arm 72, the contact 71 numbered "2" the lead 79, and the operating circuit of the first code relay 22a1. As a result the first code relay is operated to close its make contacts 55a and maintained in operated condition by its latching contacts. The first code signal also passes through the resistor 86 to change the bias of the transistor 83 which is then cut off to prevent the signal from passing to the defeater relay 23a.

When the contact arm 63 of the signal transmitter 21a engages the contacts 58 numbered "5" and "7," the above-described course of events is repeated, whereby the second and third code relays 22a2 and 22a3 are operated by second and third code signals passing through the closed make contacts 55a of the first and second code relays 22a2 and 22a3 respectively. When the contact arm 63 of the signal transmitter 21a engages the contact 58 numbered "10," a fourth code signal is passed to the operating circuit 87 through the closed make contacts 55a of the third code relay 22a3.

Shortly after the contact arm 63 of the signal transmitter has been rotated past the contact 58 numbered "12," the supply circuit of the motor 66 is opened by the cam controlled contacts 68 so that the motor stops with the contact arm in its initial position. Immediately after the contact arm 72 of the switching device 24a has disengaged the contact 71 numbered "12," it engages momentarily the contact 81, and as a result a signal is passed from the voltage source 82 through the contact 81, the contact arm 72, the brush contact 77 and the transistor 83 to the operating circuit of the defeater relay 23a which opens its break contacts 53a to unlatch all code relays. Immediately after the contact arm 72 has disengaged the contact 81, the cam controlled contacts 75 open the supply circuit of the motor 73 so that the motor stops with the contact arm in its initial position, thus terminating the operating cycle.

If during the course of the operating cycle a false signal is supplied, the defeater relay 23a is operated to unlatch all previously operated code relays. Suppose for example that the operator has depressed the switch 59 associated with the contact 58 numbered "8" instead of the switch 59 associated with the contact 58 numbered "7." When the contact arm 62 engages the contact 58 numbered "8" the first and second code relays have already been operated and latched, but since the corresponding contact 71 of the switching device 24a is isolated or removed, the signal cannot pass to the code relays or to the bias circuit of the transistor 83. Accordingly, the transistor passes the signal to the defeater relay 23a which causes unlatching of the code relays.

As will be readily understood, the contact arm 63 of the signal transmitter 21a and the contact arm 72 of the switching device 24a may be mounted on a common shaft, or the two motors may have a common supply circuit so that the starting relay 74, the contacts 75 and the cam 76 may be eliminated. The arrangement shown in FIG. 2 is preferred in case the signal transmitter 21a is to be positioned remotely from the rest of the device; if desired the single-wire connection between the signal transmitter 21a and the switching device 24a may be replaced or supplemented by a single-channel radio connection. Naturally, the number of contacts and switches of the signal transmitter is chosen only by way of example; any desired number can be used.

In the embodiment shown in FIG. 2 the series of code relays comprises one relay for each code signal except the last one. This is preferred for reasons of cost and simplicity, but if desired or required, for example if the circuit to be operated requires a strong operating signal, a code relay can be provided also for the last code signal.

If it is desired to increase the number of available codes without increasing the number of contacts and switches of the signal transmitter and the switching device, it is sufficient to increase the number of code relays and arrange the contact arms of the signal transmitter and the switching device to perform two (or more) full revolutions during each operating cycle. A first group of code signals are preset to be supplied during the first revolution and after the contact arms have stopped, a second group of code signals are preset to be supplied during the second revolution.

In the embodiment shown in FIG. 3 the code relay device 22b is similar to that shown in FIG. 2 and comprised of three latching relays 22b1, 22b2 and 22b3 having make contacts 55b and latching contacts. Likewise, the defeater relay 23b with its break contacts 53b and the controlled-conduction device 78b with its transistor 83b, resistors 84b and 86b, and diodes 85b are similar to the corresponding elements shown in FIG. 2. The switching device 24b differs from that shown in FIG. 2 mainly in that it is provided with three circular rows of contacts 71b1, 71b2, and 71b3, each having an angularly movable contact arm 72b1, 72b2 and 72b3 and a brush contact 77b1, 77b2 and 77b3 engaging the contact arm. The contact arms are secured to a common shaft 88 to be moved in unison.

Each circular row of contacts comprises 10 contacts numbered from "0" to "9." In the first or rightmost row of contacts 71b1 the contact numbered "6" is connected to the operating circuit of the first code relay 22b1, in the second or middle row the contacts numbered "8" and 3 are connected to the operating circuits of, respectively, the second and third code relays 22b2 and 22b3 in the same manner as described above in connection with FIG. 2, and in the third or leftmost row the contact numbered "8" is connected to make contacts 55b of the third code relay. The contact arms are aligned so as to engage simultaneously all identically numbered contacts during their angular movement, and in the initial position they assume an angular position between the contacts numbered "9" and "0" as shown.

The signals are supplied by means of three selectively actuatable pushbutton switches 21b1, 21b2 and 21b3 which are marked respectively "A," "B" and "C" and connected to respective ones of the brush contacts 77b1, 77b2 and 77b3 through signal transmission leads 65b1, 65b2 and 65b3 and to the emitter-collector circuit of the transistor 83b through diodes 89.

To the shaft 88 there is secured a telephone-type dial 90 by means of which the shaft and the contact arms secured thereto may be moved angularly in the clockwise direction against the bias of the return spring (not shown).

In operating the device shown in FIG. 3 the operator has to dial a figure and actuate one of the pushbutton switches of the signal transmitter 21b for each element of the code. Thus, the operating cycle comprises as many dialling operations as there are elements of the code. With the connections shown the elements of the code are 6A, "8B," 3B, and 8C. the operation is as follows:

First the operator dials the FIG. "6" so that the contact arms engage the contacts numbered "6" and then he closes the pushbutton switch marked A. As a result the first code relay 22b1 is operated through the signal transmission lead 65b1, the brush contact 77b1, the contact arm 72b1, and the contact 71b1 marked "6." Naturally, the dial 90 has to be retained in the dialed position while the pushbutton switch is actuated. If desired an interlock may be provided between the dial 90 and the signal transmitter 21b to retain the dial in the dialed position until the pushbutton switch is released.

Next the operator dials "8" and actuates the pushbutton switch marked "B," then he dials 3 and actuates the same pushbutton switch again, and finally he dials "8" and actuates the pushbutton switch marked C. The code relays are operated in the same manner as described in connection with FIG. 2 to establish the control circuit 87b and, as likewise described, the controlled-conduction device 78b serves to prevent the correct code signals from operating the defeater relay 23b and to pass any false signal to the defeater relay so as to cause unlatching of any latched code relay.

No specific means for automatically unlatching the code relays is shown in FIG. 3, but as will be readily understood the operating circuit or any device operated thereby can be arranged to provide for automatic unlatching after operation. Another possibility is to provide time delay means to cause unlatching a predetermined time after any code relay has been operated. Naturally, the unlatching may be effected by depressing any one of the pushbutton switches after the operating circuit has been energized.

Although in the embodiment shown in FIG. 3 the switching device is provided with three rows of contacts and three contact arms to give a very large number of available codes, it will be appreciated that a large number of available codes, it will be appreciated that a large number of codes are available even if only two rows of contacts and two contact arms are provided.

Although the invention has been described with a certain degree of particularity, it is understood that the present disclosure has been made only by way of example and that numerous changes in the combination and arrangement of parts may be resorted to without departing from the spirit and scope of the invention has hereinafter claimed.

What I claim is:

1. A device for controlling the energization of a utilization circuit in response only to the supply of a sequence of signals in accordance with a preselected multicharacter code, said device comprising, in combination, manually operated signal supplying means operable to supply a discretionary sequence of signals; first relay means operable during the course of an operating cycle, to establish, in a number of steps correlated to the number of signals of said multicharacter code, a control circuit for the utilization circuit; second relay means operable, when transferred during the course of said operating cycle, to prevent completion of said control circuit during the remainder of said operating cycle; and switching means connected to said signal supplying means and to said first and second relay means, and operable, in accordance with said sequence of signals supplied by said manually operated signal supplying means, to direct each signal of the sequence which is supplied in accordance with said preselected multicharacter code to said first relay means, and to direct any signals of said sequence, supplied by said manually operated signal supplying means, which is not in accordance with said preselected multicharacter code to said second relay means to transfer the latter to prevent completion of said control circuit by said first relay means.

2. A device as set forth in claim 1 wherein said first relay means includes a latching relay which is operable by a signal supplied by said signal supplying means to close make contacts arranged to pass a subsequent signal supplied by said signal supplying means.

3. A device as set forth in claim 1 wherein said first relay means comprises a series of latching relays having make contacts, each said latching relay being operable by a signal supplied by said signal supplying means, said make contacts of each relay of said series except the last one being connected in series with the operating circuit of the next succeeding relay.

4. A device as set forth in claim 3 wherein said series of latching relays consists of one latching relay for each signal of said preselected multicharacter code except the last one, said make contacts of said last relay of said series being connected in series with said control circuit.

5. A device as set forth in claim 3 wherein said second relay means comprises a relay having break contacts arranged when opened to cause unlatching of any previously latched relays of said series of latching relays.

6. A device as set forth in claim 3 wherein said switching means comprises a stationary contact member for each signal of said preselected multicharacter code, said contact members being connected to said first relay means, movable actuating means adapted to act on each said contact member during the course of said operating cycle to connect said first relay means with said signal supplying means, and normally conducting controlled-conduction means connected to said second relay means and operable by signals supplied in accordance with said preselected multicharacter code to prevent operation of said second relay means.

7. A device as set forth in claim 1 wherein said switching device includes an additional contact member adapted to be momentarily acted on by said actuating member at the termination of said operating cycle to connect said second relay means to a voltage source to cause operation of said second relay means, said second relay means comprising a relay having break contacts arranged when opened to cause unlatching of any previously latched relay of said series of latching relays.

8. A device as set forth in claim 1 wherein said actuating means of said switching means includes at least two actuating members which are movable in unison and arranged to act on different ones of said contact members, and wherein said signal supplying means includes as many selectively operable signal supplying members as there are actuating members of said actuating means, said signal supplying members being associated with respective ones of said actuating members.

9. A device as set forth in claim 1 wherein said switching means includes normally conducting controlled-conduction means connected to said second relay means and having control means operable by signals supplied in accordance with said preselected multicharacter code to prevent operation of said second relay means by causing said controlled-conduction means to assume a nonconducting condition.

10. A device as set forth in claim 9 wherein said control means comprises bias means normally maintaining said controlled-conduction means in a conducting condition, said bias means being connected to receive only signals supplied in accordance with said preselected multicharacter code to cause said controlled-conduction means to assume a nonconducting condition.

11. A device as set forth in claim 1 wherein said second relay means comprises a latching relay having break contacts connected in series with said control circuit.

12. A device as set forth in claim 1 wherein said signal supplying means comprises a voltage source, a plurality of spaced stationary contact members, an actuating member movable to act on said contact members sequentially and in synchronism with the operation of said switching means, said contact members being selectively presettable to connect said voltage source with said switching means when they are acted on by said actuating member.

13. A device as set forth in claim 1, wherein said signal supplying means comprises a voltage source, a plurality of spaced stationary contact members, a capacitor between each of said contact members and one pole of a DC voltage source, means for selectively charging said capacitors, and an actuating member which is movable to act on said contact members sequentially during the course of the operating cycle to effect discharging of any charged capacitor through output circuit means.